(12) United States Patent
Jin

(10) Patent No.: US 7,451,782 B2
(45) Date of Patent: Nov. 18, 2008

(54) FLOW PATH CONTROL VALVE

(76) Inventor: Kum Soo Jin, 401 Jupung Village, Gil 2-dong, Gangdong-gu, Seoul 137-809 (KR)

( * ) Notice: Subject to any disclaimer, the term of this patent is extended or adjusted under 35 U.S.C. 154(b) by 0 days.

(21) Appl. No.: 10/580,565

(22) PCT Filed: Nov. 27, 2004

(86) PCT No.: PCT/KR2004/003097

§ 371 (c)(1),
(2), (4) Date: Mar. 26, 2007

(87) PCT Pub. No.: WO2005/252424

PCT Pub. Date: Jun. 9, 2005

(65) Prior Publication Data
US 2007/0267593 A1  Nov. 22, 2007

(30) Foreign Application Priority Data
Nov. 28, 2003  (KR)  ...................... 10-2003-0085673

(51) Int. Cl.
*F16K 51/00* (2006.01)
(52) U.S. Cl. .............. 137/614.2; 137/487.5; 250/30.03; 250/38
(58) Field of Classification Search .............. 137/614.2, 137/487.5; 251/30.03, 38
See application file for complete search history.

(56) References Cited

U.S. PATENT DOCUMENTS

| | | | |
|---|---|---|---|
| 2,666,451 A | * | 1/1954 | Ray .......................... 251/30.03 |
| 3,030,981 A | * | 4/1962 | Chatham et al. .......... 251/30.03 |
| 4,387,878 A | | 6/1983 | Zukausky |
| 5,333,643 A | | 8/1994 | Gilchrist et al. |
| 5,413,308 A | | 5/1995 | Hayes |
| 5,687,759 A | * | 11/1997 | Tan .......................... 137/487.5 |

* cited by examiner

Primary Examiner—Kevin L Lee
(74) Attorney, Agent, or Firm—Birch, Stewart, Kolasch & Birch, LLP (57) ABSTRACT

The present invention relates to a flow path control valve capable of preventing a back flow of a fluid by maintaining inner pressure of a valve chamber constant. An object of the present invention is to provide a flow path control valve, which can rapidly and accurately control a flow path for a working fluid and also prevent a back flow of a working fluid without an additional check valve, thereby reducing the size of the product. A flow path control valve of the present invention for achieving the object comprises a housing formed with a valve chamber that can be in fluid communication with an inlet and an outlet; an opening/closing member installed movably within the valve chamber for moving between an opening position and a closing position to open or close a passage between the inlet and the outlet; an elastic member installed within the valve chamber to bias the opening/closing member toward the closing position; and a solenoid installed at a side of the housing to electromagnetically moving the opening/closing valve. A side of the opening/closing member is formed with a pressure equilibrium hole for causing the valve chamber to be in fluid communication with the inlet. A bypass tube is provided to discharge a fluid, which has been introduced into the valve chamber through the pressure equilibrium hole, to the outlet.

1 Claim, 10 Drawing Sheets

FIG. 1

Prior Art

FIG. 2

Prior Art

FIG. 3

Prior Art

FIG. 4

Prior Art

FLOW PATH CONTROL VALVE

TECHNICAL FIELD

The present invention relates to a flow path control valve for electronically controlling opening and closing of a flow path, and more particularly, to a flow path control valve capable of preventing a back flow of a fluid by maintaining inner pressure of a valve chamber constant.

BACKGROUND ART

Generally, a flow path control valve for controlling a flow path for a circulating fluid is used in hydraulic pressure generating apparatuses including hydraulic pumps, hydraulic actuators, and pumps. Such a flow path control valve is used in air conditioning facilities, automation facilities or the like so that it can control a flow path through automatic operation thereof or depending on operation conditions in accordance with hydraulic pressure generating apparatuses.

Figure 1:
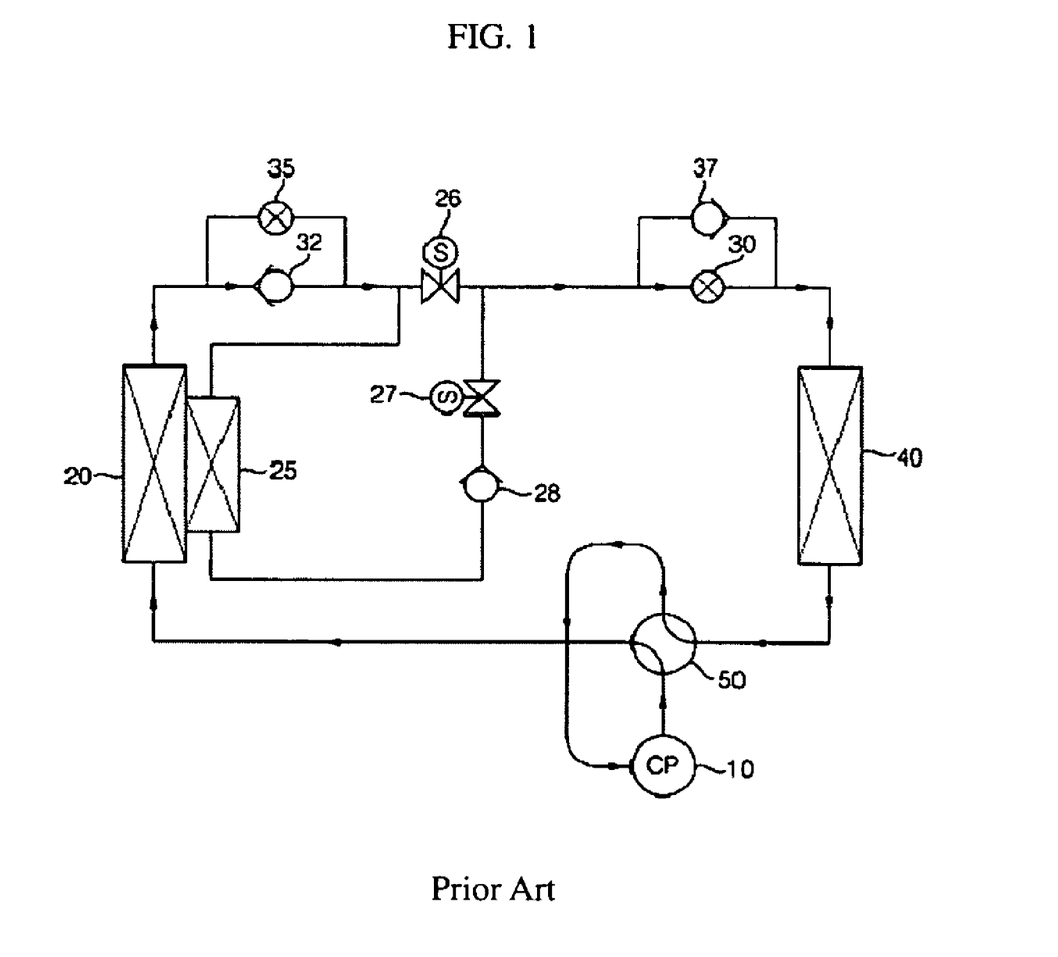
FIG. 1 is a view showing a cooling system established by a heat pump type air conditioner employing a conventional flow path control valve.
Figure 2:
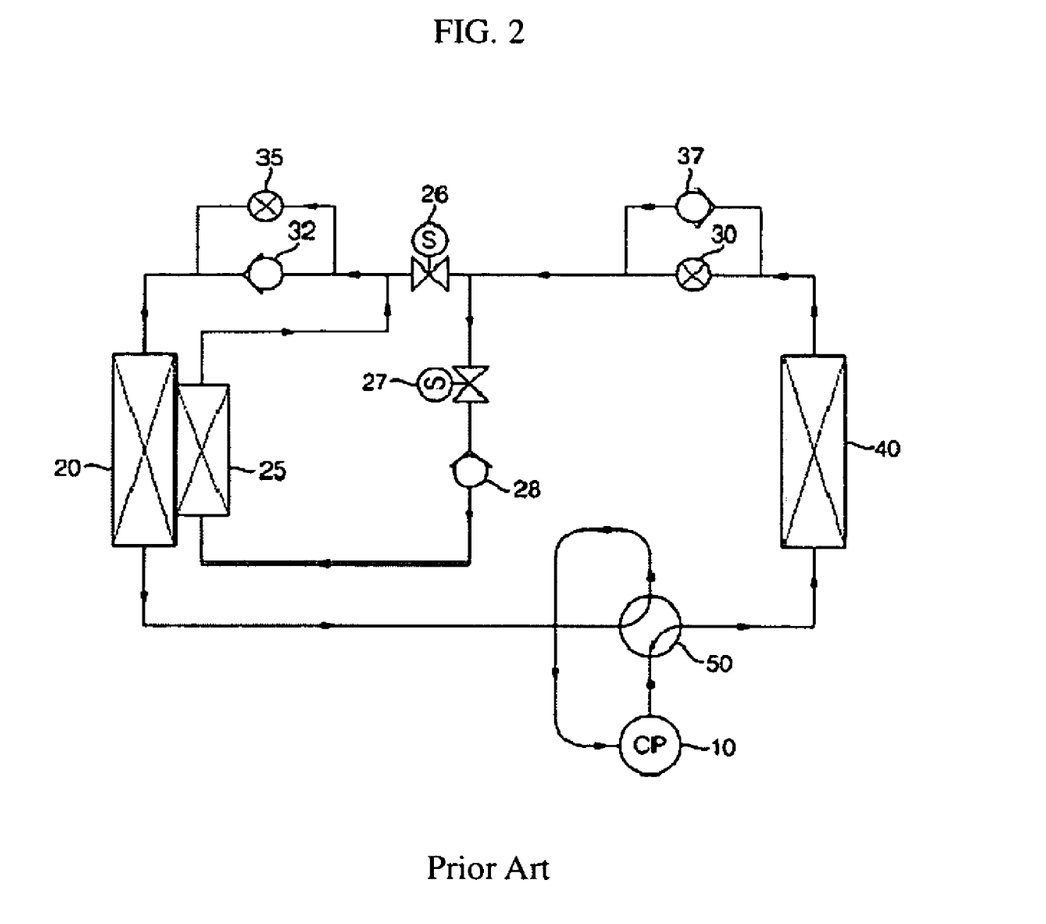
FIG. 2 is a view showing a heating system established by the heat pump type air conditioner employing the conventional flow path control valve.

FIGS. 1 and 2 are views showing heating and cooling systems established by a heat pump type air conditioner employing a conventional flow path control valve. As shown in FIG. 1, when the heat pump type air conditioner is used as a cooling system, the heat pump type air conditioner comprises a compressor 10 for compressing a working fluid at medium temperature and low pressure to be the working fluid at high temperature and pressure; an outdoor heat exchanger 20 for heat-exchanging the working fluid at high temperature and pressure, which has been compressed by the compressor 10, with external air so as to be condensed into the working fluid at low temperature and high pressure; a first expansion valve 30 for decompressing the working fluid at low temperature and high pressure, which has been discharged from the outdoor heat exchanger 20, to be the working fluid at low temperature and pressure; and an indoor heat exchanger 40 for heat-exchanging the working fluid at low temperature and pressure, which has been expanded in the first expansion valve, with room air so as to be the working fluid at medium temperature and low pressure through phase change. Further, a first check valve 32 for preventing a back flow of the working fluid is installed between the first expansion valve 30 and the outdoor heat exchanger 20.

The heat pump type air conditioner can also heat a room by controlling a flow path for the working fluid, as shown in FIG. 2. To this end, a 4-way valve 50 for changing the flow path for the working fluid is installed on a discharge side of the compressor 10. Meanwhile, the working fluid at high temperature and pressure, which has been compressed by the compressor 10, is reverse circulated through a flow path changed by the 4-way valve 50. The working fluid at high temperature and pressure, which is reverse circulated in such a manner, is heat-exchanged with the indoor heat exchanger 40 to be the working fluid at low temperature and high pressure. Meanwhile, in the heating operation of the air conditioner, the first expansion valve 30 is closed, and the working fluid at low temperature and high pressure passes through a second check valve 37 parallel connected to the first expansion valve 30. The working fluid, which has passed through the second check valve 37, then passes through a second expansion valve 35 to be the working fluid at low temperature and pressure. The working fluid, which has passed through the second expansion valve 35, is heat-exchanged with the outdoor heat exchanger 20 to be the working fluid at medium temperature and low pressure, and then returned to the compressor 10 via the 4-way valve 50. Further, an auxiliary condenser 25 for lowering the temperature of the working fluid is installed between the first expansion valve 30 and the first check valve 32. To this end, the flow path is formed with a branch line to supply the working fluid to the auxiliary condenser 25, and a first solenoid valve 26 for controlling the circulation of the working fluid is installed at a trailing end of the branch line. Further, a second solenoid valve 27 for controlling the inflow of the working fluid upon forward circulation of the working fluid is installed between the second check valve 37 and the auxiliary condenser 25, and a third check valve 28 for preventing a back flow of the working fluid is installed at the rear of the second solenoid valve 27.

Figure 3:
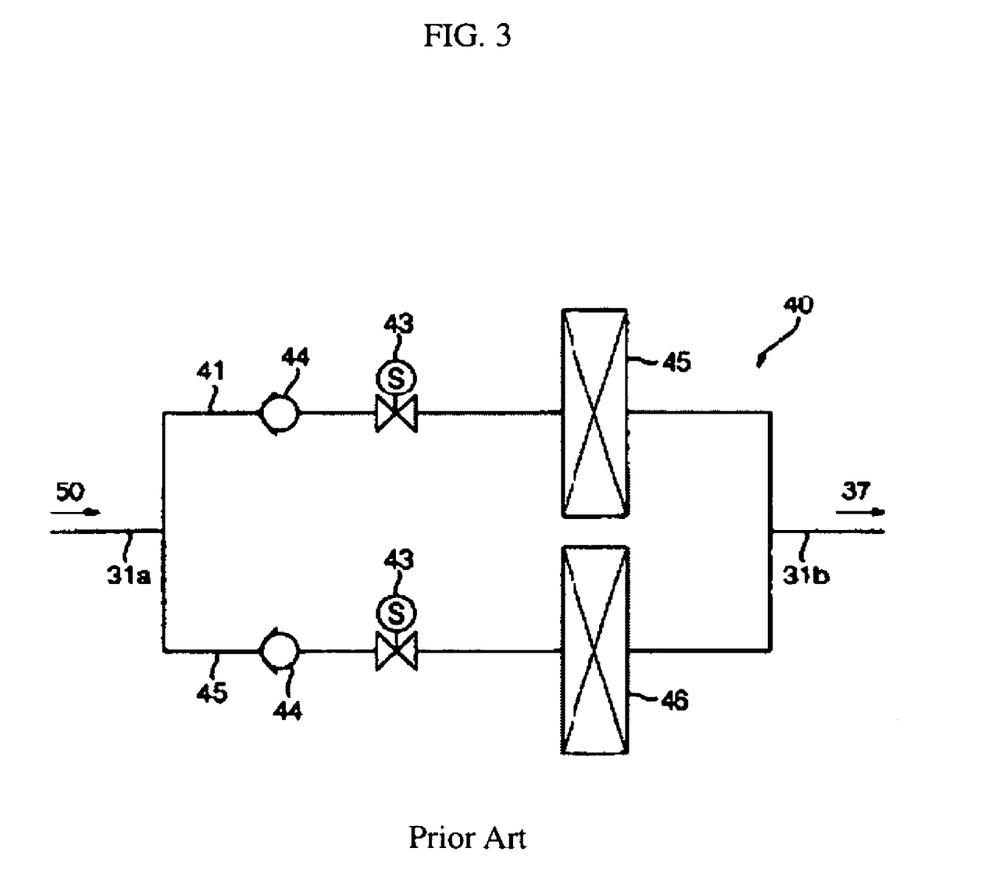
FIG. 3 is a view showing a configuration of a variance of the conventional heat pump type air conditioner.

Next, FIG. 3 that is a view showing a variation in a part of such a conventional heat pump type air conditioner will be described below. In the conventional air conditioner, as shown in FIG. 3, refrigerant vapor compressed by the compressor 10 is discharged to a single conditioner 31a to which parallel conduits 41 and 42 are connected, and an air-cooling type heat exchanger 45 or water-cooling type heat exchanger 46 is separately installed at one of the parallel conduits 41 and 42 according to the type of condensing the working fluid. At this time, in case of the air-cooling type heat exchanger 45, heat of condensation produced when the working fluid such as a refrigerant is condensed with ambient air heats the air that in turn will be used for convection heating or the like. In case of the water-cooling type heat exchanger 46, heat of condensation produced when the working fluid is condensed with water generates hot water that in turn will be used for condensing heating, hot water supply or the like. Then, the working fluid that has been selectively branched is supplied to a single conduit 31b to establish a circulation cycle.

Meanwhile, upon selective operation of the air-cooling type heat exchanger 45 or the water-cooling type heat exchanger 46, respective solenoid valves 43 installed at inlets d the air-cooling type heat exchanger 45 and the water-cooling type heat exchanger 46 are controlled to be selectively opened or closed, so that the working fluid can be selectively supplied to one of the parallel conduits 41 and 42. Here, since the solenoid valve 43 is constructed to be opened or closed under control according to a detection value from a sensor installed at the air-cooling type heat exchanger 45 or the water-cooling type heat exchanger 46, the sensor malfunctions upon occurrence of a back flow of the working fluid, resulting in incomplete selective opening or closing d the flow path and lowered reliability of the operation d the solenoid valve 43.

Figure 4:
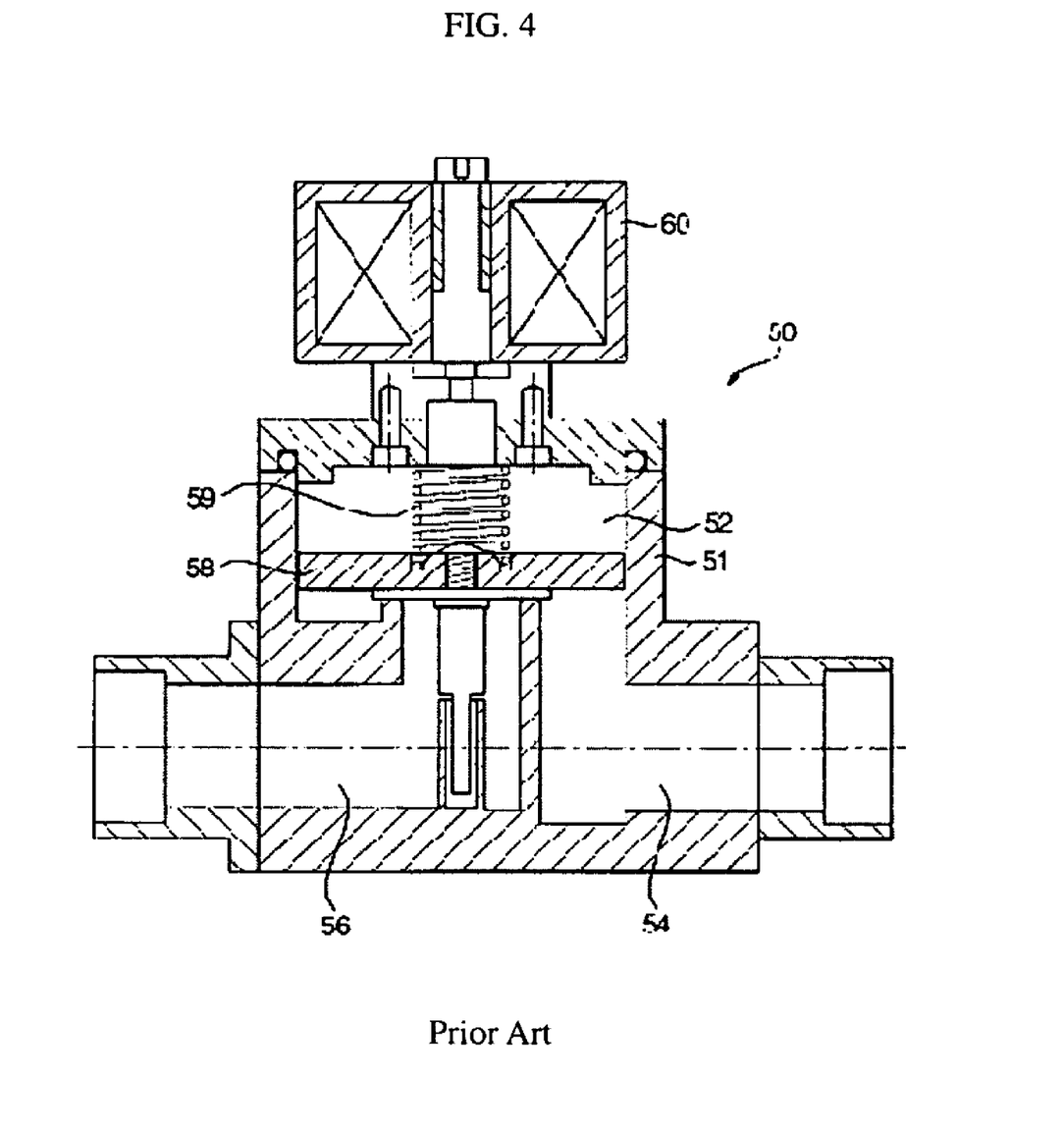
FIG. 4 is a sectional view of a conventional solenoid valve.

FIG. 4 is a sectional view of the solenoid valve used for the conventional heat pump type air conditioner. The solenoid valve 26, 27 or 43 comprises a housing 51 formed with a valve chamber 52 that can be in fluid communication with an inlet 52 and an outlet 56, an opening/closing member 58 installed movably within the valve chamber 52 for moving between an opening position and a closing position to open or close a passage between the inlet 54 and the outlet 56, an elastic member 59 installed within the valve chamber 52 to bias the opening/closing member 58 toward the closing position, and a solenoid 60 installed at a side of the housing 51 to electromagnetically moving the opening/closing valve 58. When the solenoid valve is supplied with electric power, the opening/closing member 58 is moved to the opening position by means of excitation force from the solenoid 60. When the excitation force from the solenoid 60 is removed, the opening/closing member 58 is moved to the closing position by means of restoring force from the elastic member 59.

However, if pressure of the working fluid acting in a reverse direction when the conventional solenoid valve 26, 27 or 43 is closed increases, there may be a case where the opening/closing member 58 of the solenoid valve is opened. To prevent this in the prior art, the check valves 28 and 44 are installed at the rears of the solenoid valves 26, 27 and 43 to prevent a back flow of the working fluid. Therefore, since the check valve should be additionally installed at the rear of the solenoid valve to prevent the back flow of the working fluid in the prior art, it results in a complicated structure. Particularly, an air conditioning system employing a large number of solenoid valves and check valves has problems in that its structure is complicated and the number of parts increases, resulting in increased costs.

DISCLOSURE OF INVENTION

Technical Problem

An object of the present invention is to provide a flow path control valve, which can rapidly and accurately control a flow path for a working fluid and also prevent a back flow of a working fluid without an additional check valve, thereby reducing the size of the product. Further, another object of the present invention is to provide a flow path control valve capable of selectively controlling respective flow paths.

Technical Solution

A flow path control valve of the present invention for achieving the object comprises a housing formed with a valve chamber that can be in fluid communication with an inlet and an outlet; an opening/closing member installed movably within the valve chamber for moving between an opening position and a closing position to open or close a passage between the inlet and the outlet; an elastic member installed within the valve chamber to bias the opening/closing member toward the closing position; and a solenoid installed at a side of the housing to electromagnetically moving the opening/closing valve. A side of the opening/closing member is firmed with a pressure equilibrium hole for causing the valve chamber to be in fluid communication with the inlet. A bypass tube is provided to discharge a fluid, which has been introduced into the valve chamber through the pressure equilibrium hole, to the outlet.

The flow path control valve may further comprise an auxiliary valve chamber formed between the outlet and a discharge portion of the valve chamber; an auxiliary opening/closing member movably installed in the auxiliary valve chamber to move between an opening position and a closing position where it can open and close a passage between the outlet and the discharge portion of the valve chamber, respectively; an auxiliary elastic member disposed within the auxiliary valve chamber to bias the auxiliary opening/closing member to the closing position; and an auxiliary pressure equilibrium hole formed at a side of the opening/closing member to cause the auxiliary valve chamber to be in fluid communication with the outlet of the housing.

Advantageous Effects

According to the flow path control valve of the present invention constructed as above, a back flow of a working flow is prevented without installation of an additional check valve, resulting in a simplified structure and a reduced installation space. Further, since the flow path control valve is opened or closed by means of the pressure of the working fluid, the flow path control valve can be rapidly and accurately operated and the reliability of the product can also be improved.

BEST MODE FOR CARRYING OUT THE INVENTION

Hereinafter, preferred embodiments of the present invention will be described in detail with reference to accompanying drawings.

Figure 5:
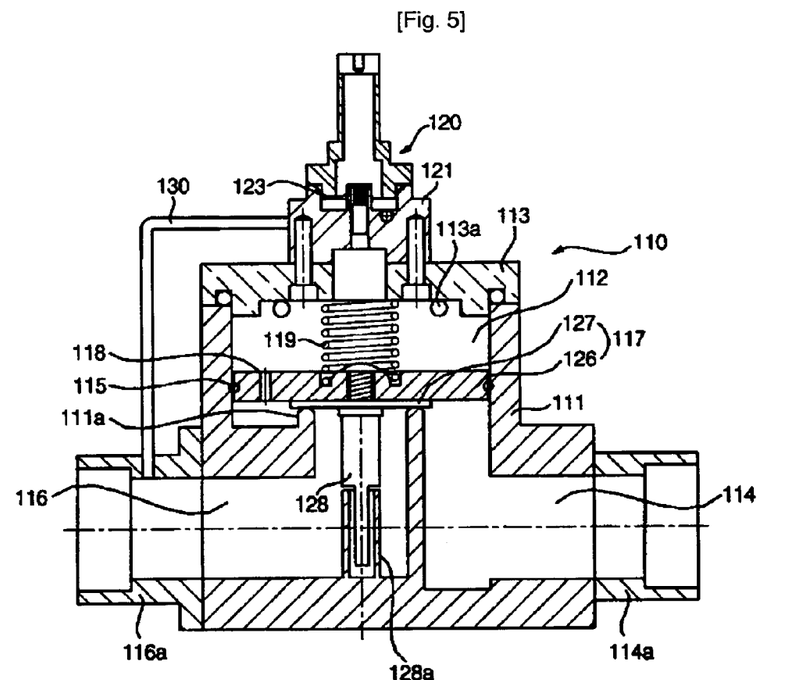
FIG. 5 is a sectional view of a flow path control valve according to the present invention.
Figure 6:
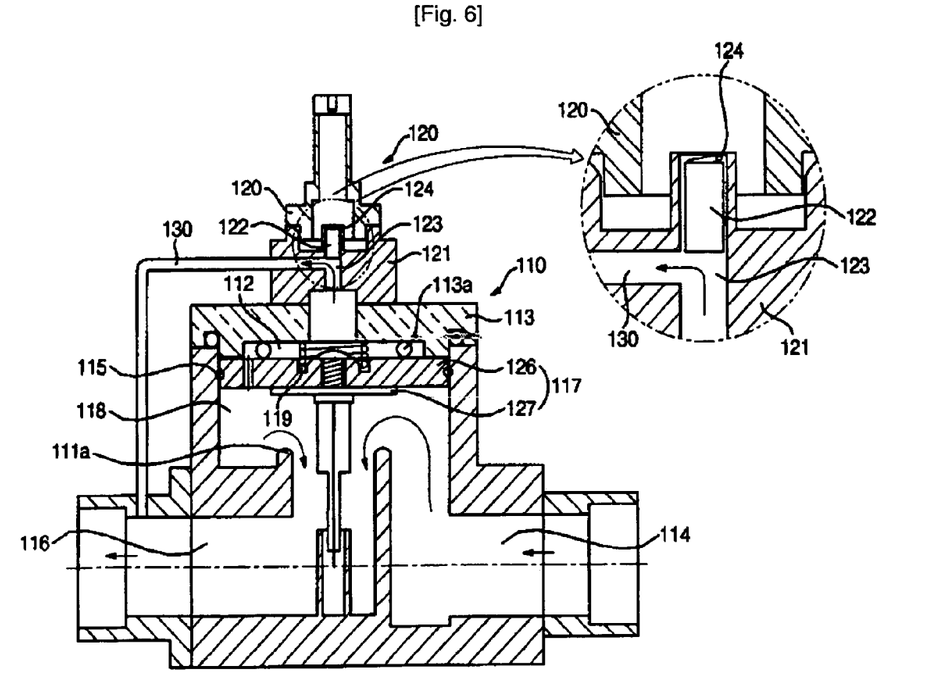
FIG. 6 is a view showing an operating state where a working fluid circulates forward in the flow path control valve according to the present invention.
Figure 7:
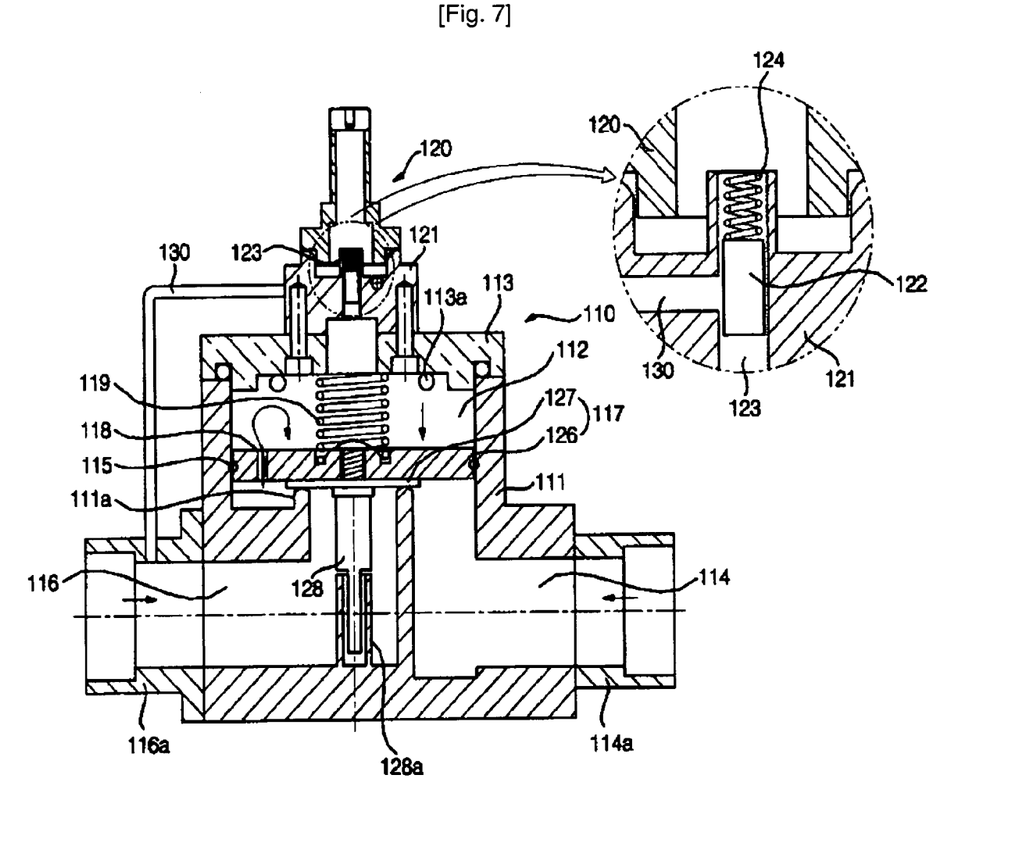
FIG. 7 is a view showing an operating state where the working fluid circulates reverse in the flow path control valve according to the present invention.

Referring to FIGS. 5 to 7 showing sectional views of a flow path control valve according to the present invention, the flow path control valve 110 according to the present invention comprises a housing 111 firmed with a valve chamber 112 that can be in fluid communication with an inlet 114 and an outlet 116, an opening/closing member 117 installed movably within the valve chamber 112 for moving between an opening position and a closing position to open or close a passage between the inlet 114 and the outlet 116, an elastic member 119 installed within the valve chamber 112 to bias the opening/closing member 117 toward the closing position, and a solenoid 120 installed at a side of the housing 111 to electromagnetically moving the opening/closing valve 117. A side of the opening/closing member 117 is formed with a pressure equilibrium hole 118 for causing the valve chamber 112 to be in fluid communication with the inlet 114 so that inner pressure of the valve chamber 112 can be maintained at certain pressure. Here, the valve chamber 112 is covered with a fixing cover plate 113 to which the solenoid valve 120 is fixed. Further, a solenoid valve connecting member 121 connected to the solenoid valve 120 to be in communication with a through-hole 123 thereof is installed on the fixing cover plate 113. Here, the through-hole 123 is formed at the center of the solenoid valve connecting member 121, and a packing material 113*a* is installed between the fixing cover plate 113 and the opening/closing member 117 to serve as a seal between the valve chamber 112 and the through-hole 123 when the opening/closing member 117 is moved to the closing position.

Moreover, a bypass tube 130 is connected to a side of the solenoid valve connecting member 121 to discharge a fluid, which has been introduced into the valve chamber 112 through the pressure equilibrium hole 118, to the outlet 116. The solenoid valve connecting member 121 comprises a float 122 slidable within the solenoid valve connecting member 121, and a spring 124 for elastically repelling the float 122.

An inlet-side conduit connecting portion 114a is installed at the inlet 114 to be connected to tubing of the air conditioner so that the working fluid can be introduced thereinto. An outlet-side conduit connecting portion 116a is installed at the outlet 116 so that the working fluid which has passed through the flow path control valve 110 can be discharged therethrough. A valve seat 111a with which the opening/closing member 117 comes into contact protrudes in a passage between the inlet 114 and the outlet 116. Here, the opening/closing member 117 comprises a disk 126 for blocking the passage between the inlet 114 and the outlet 116. A packing material 127 is attached to the bottom of the disk 126 and comes into close contact with the valve seat 111a to prevent the occurrence of a clearance when blocking the passage between the inlet 114 and the outlet 116. The packing material 127 can be formed as a rubber member. Further, the packing material 127 may be made of a material with a superior sealing function such as Teflon.

Moreover, a sealing material 115 for maintaining sealing is provided between the opening/closing member 117 and the valve chamber 112. A guide rod 128 protrudes from the center of the disk 126, and the interior of the housing 111 is formed with a guide bore 128a into which the guide rod 128 is inserted reciprocatingly.

The operation of the flow path control valve of the present invention constructed as above will be described below. To achieve the operation of the flow path control valve 110, the flow path control valve 110 is first installed at the tubing of the air conditioner. To this end, the inlet-side conduit connecting portion 114a and the outlet-side conduit connecting portion 116a of the flow path control valve 110 are connected to the tubing of the air conditioner, and the working fluid is supplied thereto. When electric power is then supplied to the solenoid valve 120, the float 122 placed in the solenoid valve connecting member 121 is moved to the opening position by means of magnetic force while overcoming the elastic force of the spring 124, and the opening/closing member 117 is spaced apart from the valve seat 111a, as shown in FIG. 6. At this time, the working fluid in the valve chamber 112 is discharged to the outlet 116 through the bypass tube 130 connected to the side of the solenoid valve connecting member 121. Meanwhile, when the opening/closing member 117 is located at the opening position, the packing material 113a functions as a seal between the opening/closing member 117 and the fixing cover plate 113. When the opening/closing member 117 is moved to the opening position as described above, the working fluid is supplied from the inlet 114 to the outlet 116.

Meanwhile, when electric power supplied to the solenoid valve 120 is cut off, the float 122 is elastically repelled by the spring 124 and blocks the bypass tube 130 so that the working fluid in the valve chamber 112 cannot flow out, as shown in FIG. 7. At this time, the bypass tube 130 is blocked by means of the movement of the float 122 to prevent the outflow of the working fluid, and the working fluid in the housing 111 flows into the valve chamber 112 through the pressure equilibrium hole 118 formed at the opening/closing member 117 so that the inner pressure of the valve chamber 112 and the housing 111 is in equilibrium. Further, the opening/closing member 117 is moved to the closed position by means of the repulsive force of the elastic member 119 to block the passage between the inlet 114 and the outlet 116. Meanwhile, if the pressure of the working fluid at the outlet-side conduit connecting portion 116a is higher than that at the inlet-side conduit connecting portion 114a, the working fluid tends to circulate reverse. However, since the movement of the opening/closing member 117 is restricted by the pressure of the working fluid introduced into the valve chamber 112, a back flow of the working fluid is avoided.

In case of the aforementioned flow path control valve 110, there may be a back flow of the working fluid if pressure produced when the working fluid tends to flow reverse exceeds the elastic force of the elastic member 119 and the working fluid is a compressible fluid. In this case, a portion of the working fluid flowing reverse from the outlet 116 is introduced into the pressure equilibrium hole 118 and causes the inner pressure of the valve chamber 112 and the housing 111 to be in equilibrium again after elapse of a certain period of time, and the opening/closing member 117 is moved to the closed position by means of the elastic member 119, thereby preventing the back flow of the working flow.

Figure 8:
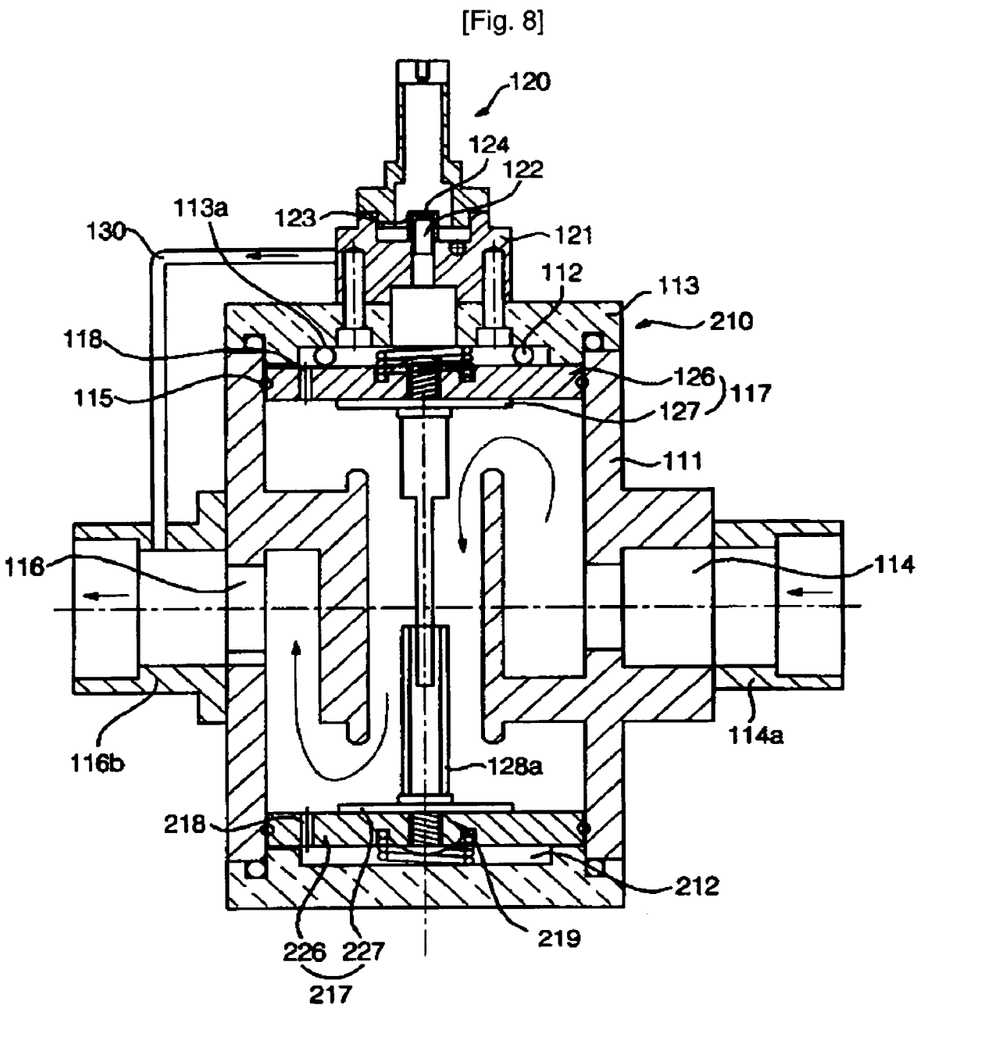
FIG. 8 is a view showing an operating state where a working fluid circulates forward in a flow path control valve according to another embodiment of the present invention.

FIG. 8 shows a sectional view of a flow path control valve according to another embodiment of the present invention for more effectively preventing the occurrence of a back flow due to high pressure of the working fluid as described above. The flow path control valve 210 further has an auxiliary valve chamber 212 in fluid communication with and between the outlet 116 and a discharge portion of the valve chamber 112 in the housing 111. An auxiliary opening/closing member 217 is movably installed in the auxiliary valve chamber 212 to move between an opening position and a closing position where it can open and close a passage between the outlet 116 and the discharge portion of the valve chamber 112, respectively. The auxiliary opening/closing member 217 comprises an auxiliary disk 226 for blocking the passage between the outlet 116 and the discharge portion of the valve chamber 112 in the housing 111. The auxiliary disk 226 is firmed with an auxiliary packing material 227 to seal a clearance between the outlet 116 and the discharge portion of the valve chamber 112 in the housing 111. Further, an auxiliary elastic member 219 for biasing the auxiliary opening/closing member 217 to the closing position is disposed within the auxiliary valve chamber 212. In addition, a side of the opening/closing member 217 is firmed with an auxiliary pressure equilibrium hole 218 for causing the auxiliary valve chamber 212 to be in fluid communication with the outlet 116 of the housing 111.

In the flow path control valve constructed as above, when the working fluid circulates forward, the auxiliary opening/closing member 217 is moved to the opening position by means of the pressure of the working fluid to allow the working fluid to flow through the passage.

Figure 9:
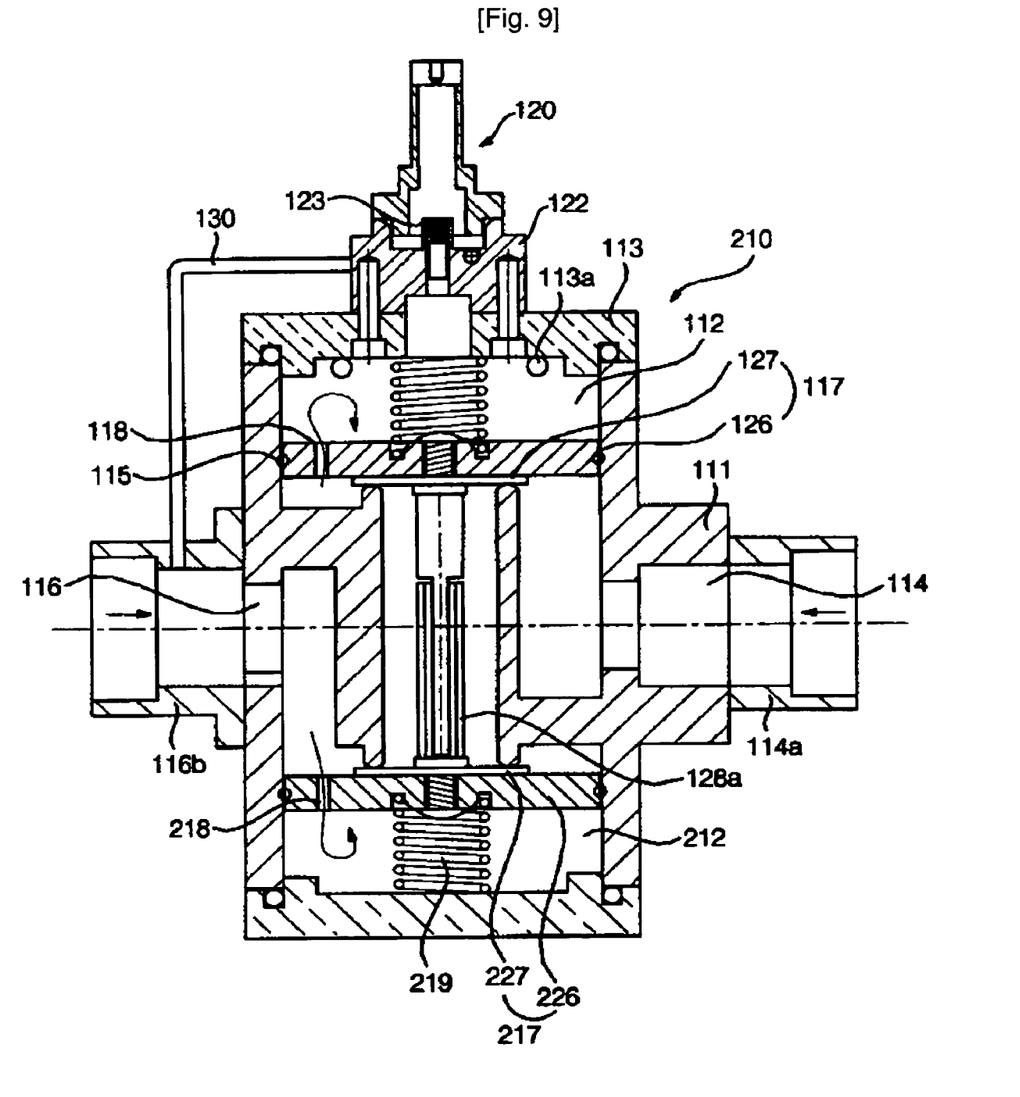
FIG. 9 is a view showing an operating state where the working fluid circulates reverse in the flow path control valve according to the other embodiment of the present invention.

On the contrary, when the working fluid circulates reverse, the working fluid introduced from the outlet 116 of the housing 111 flows into the auxiliary valve chamber 212 through the auxiliary pressure equilibrium hole 218, as shown in FIG. 9. When the pressure of the working fluid introduced into the auxiliary valve chamber 212 is in equilibrium with the pressure of the outlet 116, the auxiliary opening/closing member 217 is moved to the closing position by means of elastic force of the elastic member 219.

Figure 10:
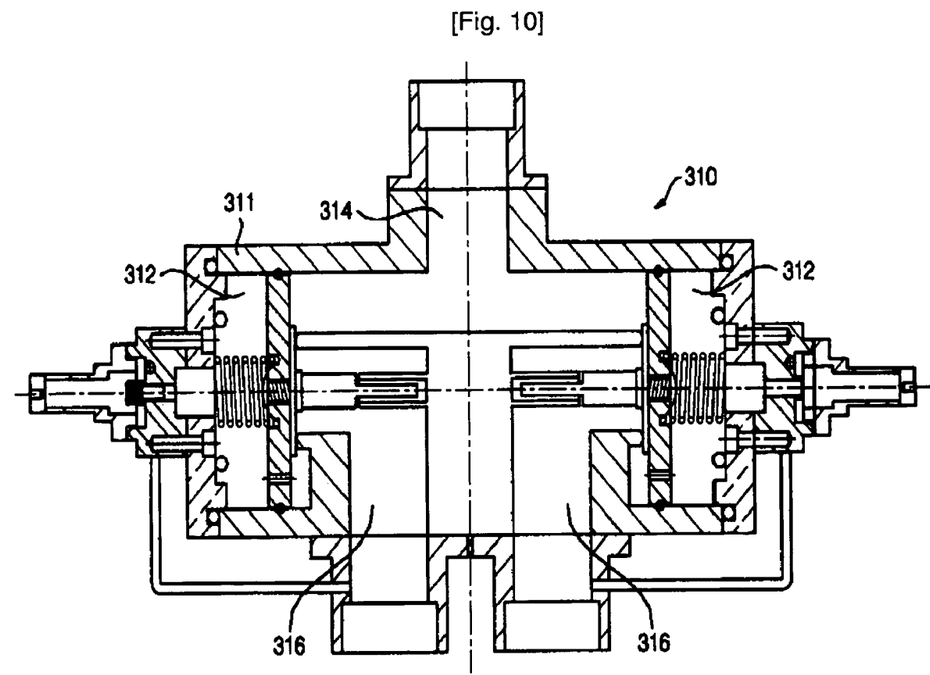
FIG. 10 is a sectional view of a flow path control valve with two valve chambers according to a further embodiment of the present invention.
Figure 11:
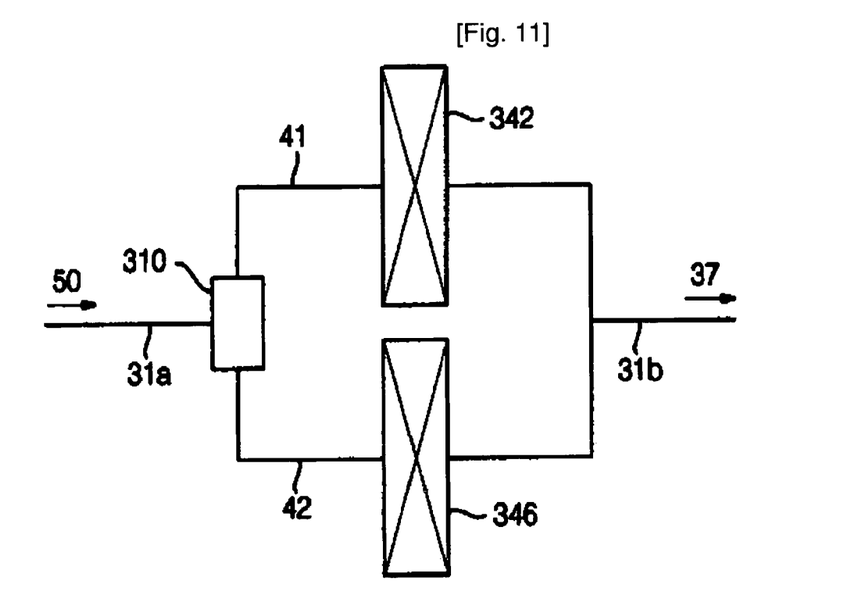
FIG. 11 is a view of a system employing the flow path control valve with two valve chambers according to the further embodiment of the present invention.

The flow path control valve of this embodiment is constructed to be connected to a single conduit. Therefore, if the flow path control valve is intended to be installed at parallel conduits, a plurality of flow path control valves should be installed. In this regard, a flow path control valve according to a further embodiment of the present invention is constructed to have a plurality of outlets such that the flow path control valve can be installed at parallel conduits, and to selectively control a working fluid discharged through the outlets. Here, FIG. 10 is a sectional view of a flow path control valve with two valve chambers according to the further embodiment of the present invention, and FIG. 11 is a view of a system employing the flow path control valve with two valve chambers according to the further embodiment of the present invention. A description of the flow path control valve will be made with reference to these figures. The flow path control valve 310 includes a housing 311 partitioned at the center thereof to have two valve chambers 312 such that a working fluid supplied through a single inlet 314 can flow to two outlets 316, as shown in FIGS. 10 and 11.

The flow path control valve 310 with the two valve chambers 312 controls a flow path such that the working fluid introduced through a single conduit can be selectively supplied to any one of two heat exchangers 342 and 346. When the flow path control valve 310 with the two valve chambers 312 is used, there are advantages in that the length of tubing is shortened and a system can be easily constructed due to the absence of additional branch tubes, as compared with the use of a flow path control valve with a single valve chamber.

To selectively operate one of the two heat exchangers 342 and 346 connected to the flow path control valve 310 with the two valve chambers 312, electric power is supplied to one of two solenoid valves 320 installed at the valve chambers 312 and the other solenoid valve is not supplied with electric power.

Figure 12:
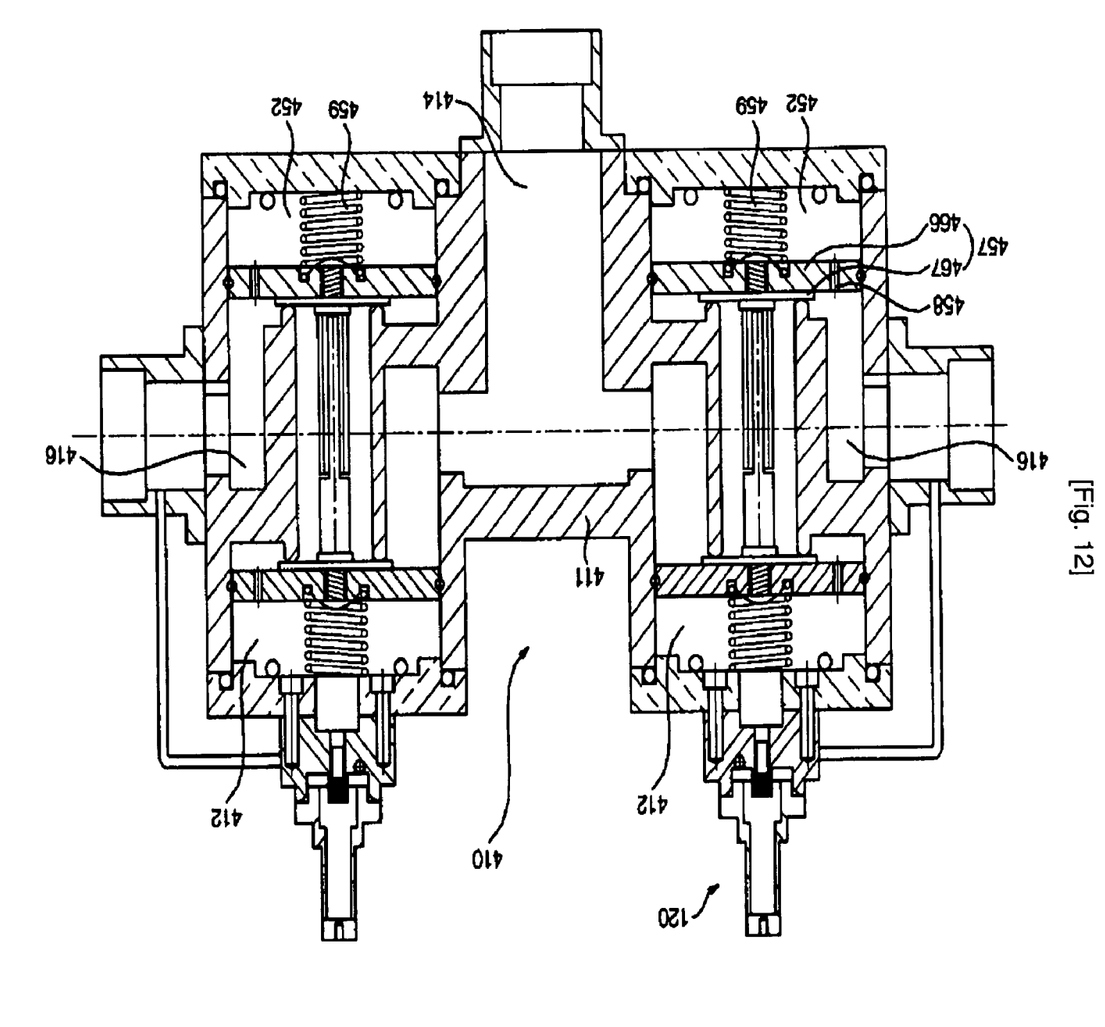
FIG. 12 is a sectional view of a variance of the flow path control valve with two valve chambers according to the further embodiment of the present invention.

FIG. 12 is a side view showing a flow path control valve according to a still further embodiment of the present invention. The flow path control valve 410 includes a housing 411 partitioned at the center thereof to have two valve chambers 412 such that a working fluid supplied through a single inlet 414 can flow to two outlets 416. An auxiliary valve chamber 452 is installed in each of the valve chambers 412 at one end of the flow path control valve 410 to prevent the working fluid from flowing reverse. An auxiliary opening/closing member 457 is movably installed in each of the auxiliary valve chambers 452. Here, the auxiliary opening/closing member 457 comprises an auxiliary disk 466 for blocking a passage between a discharge portion of each of the valve chambers 412 and the corresponding outlet 416 of the housing 411. The auxiliary disk 466 is formed with an auxiliary packing material 467 for sealing a clearance between the discharge portion of the valve chamber 412 and the outlet 416 of the housing 411. Further, an auxiliary elastic member 459 for biasing the auxiliary opening/closing member 457 to a closing position is elastically installed within the auxiliary valve chamber 452. In addition, a side of the auxiliary opening/closing member 457 is formed with an auxiliary pressure equilibrium hole 458 for causing the auxiliary valve chamber 452 to be in fluid communication with the outlet 416 of the housing 411.

Although the flow path control valve of the present invention has been described by way of example with reference to the accompanying drawings, the present invention is not limited to the aforementioned embodiments and the drawings. It will be apparent that those skilled in the art can make various modifications and changes thereto without departing from the scope of the invention defined by the appended claims.

The invention claimed is:

1. A flow path control valve, comprising:
a housing formed with a valve chamber that communicates fluidly with an inlet and an outlet;
an opening/closing member installed movably within the valve chamber for moving between an opening position and a closing position to open or close a passage between the inlet and the outlet, a side of the opening/closing member including a pressure equilibrium hole for causing the valve chamber to be in fluid communication with the inlet;
an elastic member installed within the valve chamber to bias the opening/closing member toward the closing position;
a bypass tube provided to discharge a fluid, which has been introduced into the valve chamber through the pressure equilibrium hole, to the outlet;
a float for opening and closing the bypass tube;
a solenoid installed at a side of the housing to electromagnetically move the opening/closing valve and to electromagnetically move the float;
an auxiliary valve chamber formed between the outlet and a discharge portion of the valve chamber;
an auxiliary opening/closing member movably installed in the auxiliary valve chamber to move between an opening position and a closing position where the auxiliary opening/closing member opens and closes a passage between the outlet and the discharge portion of the valve, respectively;
an auxiliary elastic member disposed within the auxiliary valve chamber to bias the auxiliary opening/closing member to the closing position; and
an auxiliary pressure equilibrium hole formed at a side of the auxiliary opening/closing member to cause the auxiliary valve chamber to be in fluid communication with the outlet of the housing.

* * * * *